(12) United States Patent
Fischer et al.

(10) Patent No.: US 8,707,424 B2
(45) Date of Patent: Apr. 22, 2014

(54) METHOD FOR MAKING SECURE EXECUTION OF A COMPUTER PROGRAMME, IN PARTICULAR IN A SMART CARD

(75) Inventors: Jean-Bernard Fischer, Le Kremlin Bicetre (FR); Hugues Thiebeauld De La Crouee, Bordeaux (FR)

(73) Assignee: Oberthur Technologies, Colombes (FR)

( * ) Notice: Subject to any disclaimer, the term of this patent is extended or adjusted under 35 U.S.C. 154(b) by 2533 days.

(21) Appl. No.: 10/563,554

(22) PCT Filed: Jul. 6, 2004

(86) PCT No.: PCT/FR2004/001755
§ 371 (c)(1),
(2), (4) Date: Apr. 14, 2006

(87) PCT Pub. No.: WO2005/008451
PCT Pub. Date: Jan. 27, 2005

(65) Prior Publication Data
US 2006/0242700 A1   Oct. 26, 2006

(30) Foreign Application Priority Data

Jul. 11, 2003  (FR) .................................... 03 08550

(51) Int. Cl.
*G06F 11/00*  (2006.01)

(52) U.S. Cl.
USPC ............... 726/22; 726/26; 713/152; 713/187; 712/234; 712/241

(58) Field of Classification Search
USPC ........ 726/22, 26; 713/152, 187; 712/234, 241
See application file for complete search history.

(56) References Cited

U.S. PATENT DOCUMENTS

| | | | | |
|---|---|---|---|---|
| 5,274,817 | A  * | 12/1993 | Stahl .............................. | 718/100 |
| 2002/0166067 | A1* | 11/2002 | Pritchard et al. .............. | 713/201 |
| 2003/0188174 | A1* | 10/2003 | Zisowski ....................... | 713/189 |
| 2003/0200406 | A1* | 10/2003 | Kouno .......................... | 711/164 |
| 2004/0158729 | A1* | 8/2004 | Szor ............................. | 713/200 |

FOREIGN PATENT DOCUMENTS

| | | |
|---|---|---|
| DE | 199 44 991 | 4/2001 |
| FR | 2 757 972 | 7/1998 |

OTHER PUBLICATIONS

Choi et al. "A New Stack Buffer Overflow Hacking Defense Technique with Memory Address Confirmation", ICICS 2001, pp. 146-159.*

* cited by examiner

*Primary Examiner* — Shewaye Gelagay
(74) *Attorney, Agent, or Firm* — Young & Thompson

(57) ABSTRACT

A method for making secure execution of a computer program includes the following steps: stacking a predetermined value in a pile of instructions of the program; and stack popping the pile, the stack popping step being adapted, as the case may be, to enable detection of an anomalous execution.

9 Claims, 1 Drawing Sheet

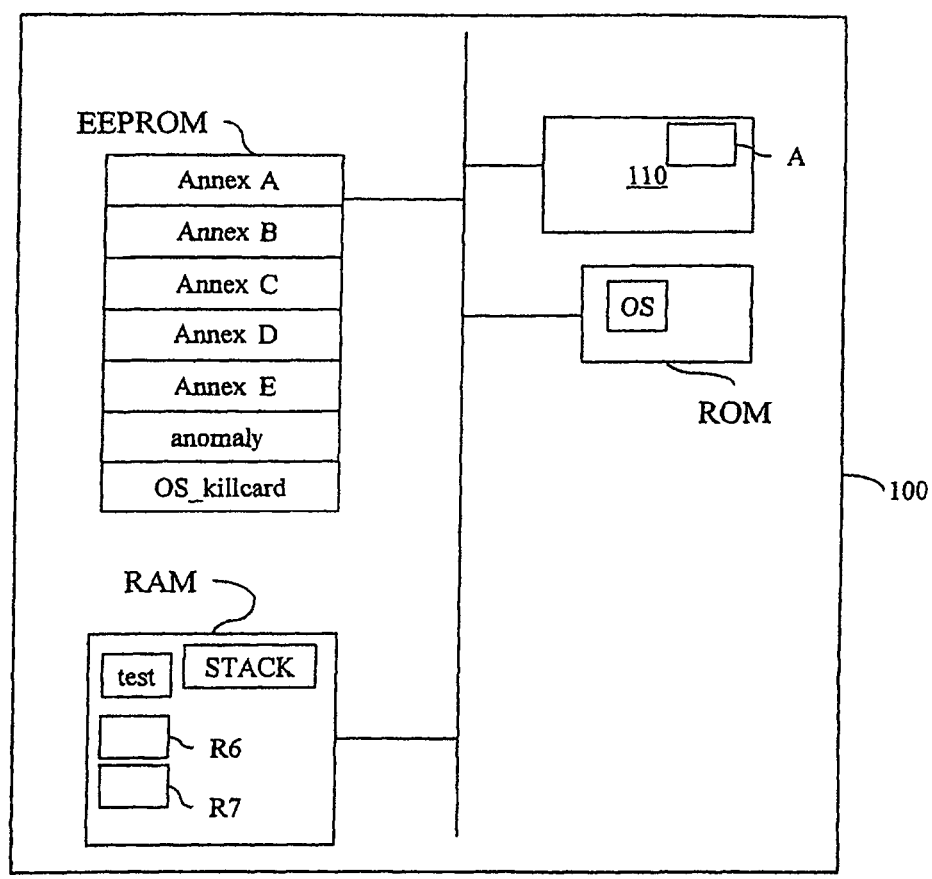

METHOD FOR MAKING SECURE EXECUTION OF A COMPUTER PROGRAMME, IN PARTICULAR IN A SMART CARD

CROSS-REFERENCE TO RELATED APPLICATIONS

The present application claims priority to and incorporates by reference PCT/FR2004/001755 filed Jul. 6, 2004 and French Application NO. 03/08550 filed Jul. 11, 2003.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

The present invention relates to a method for making the execution of a computer program secure and a secure electronic entity for implementing a method of that kind.

The invention may be used in particular to make a smart card secure.

2. Description of Related Art

References hereinafter to "making a computer program secure" mean:

detecting malicious attacks seeking to modify the normal behavior of a computer program, and also
  any processing aimed at making the execution of a computer program reliable, in particular a program executed in an environment subject to very high levels of interference, such as a satellite, or a computer program requiring very high reliability, for example a program controlling a cardiac implant.

Moreover, the expression "computer program" refers to any program, regardless of the computer language and the storage means employed. By way of nonlimiting example, the computer program may be written in machine language, assembler language, C, C++, Java or VHDL. The program may be stored in permanent memory, for example ROM, EEPROM or hard disk, or in volatile memory, for example RAM. The program may equally be implemented in the form of an integrated circuit, for example a field-programmable gate array (FPGA) or an application-specific integrated circuit (ASIC).

The present invention detects an attack intended to modify the execution of a computer program on a secure electronic entity, for example a smart card, a secure PCMIA card (for example an IBM 4758 card), a USB key or a passport integrating a contactless microchip in one of its pages. It also triggers countermeasures to such attacks.

In particular, the present invention detects attacks that interfere with the operation of an electronic entity, for example so-called fault attacks.

Such attacks seek illegitimately to modify the content or the reading of the content of a register, a memory or a bus, or to oblige a processor not to execute certain instructions of a computer program, or to execute them badly. The attacked computer program may then be executed in a very different way to that in which it was designed to be executed.

Attacks of this kind that are already known in the art include:

generating a voltage spike at one of the power supply terminals of the processor;
  suddenly increasing its temperature;
  rapidly changing its clock frequency or supply voltage;
  applying a flash of light, a laser beam or an electromagnetic field to a portion of the silicon constituting it.

In the present state of the art, the person skilled in the art knows various ways to make a computer program secure, and in particular to combat attacks by generating faults in a smart card.

A first method consists in installing sensors in the smart card components to detect these attacks.

This kind of method is of restricted efficacy, however, since it is in practice impossible to place sensors over the whole of the surface of the component. Moreover, the sensors being also made of silicon, it is possible also to interfere with them or to modify the information that they transmit.

A second prior art method used to make most smart card operating systems secure is based on the use of "semaphores", and includes:

a step of modifying the content of a memory area during the execution of a set of critical instructions; and
  a verification step which, by reading the content of the memory area cited above, verifies that the modification step cited above has been carried out.

If the memory area has not been modified, that means that the modification step has not been carried out and consequently that the critical instructions cited above have not been executed correctly.

It will be noted that in the present document the term "semaphore" refers to a concept differing from the process of the same name used in the field of programming concurrent processes.

The second method, which is implemented by software, does not have the drawbacks of the first method cited above.

Nevertheless, semaphores are conventionally implemented by variables residing in working memory (RAM) and their manipulation (positioning, reading) is relatively slow and costly in terms of memory space. This constraint represents a particularly severe penalty if the program is executed on systems having limited resources (memory, computation power, etc.), such as smart cards. The present invention is aimed at a software method that does not have the above drawbacks.

BRIEF SUMMARY OF THE INVENTION

To this end, the present invention provides a method of making the execution of a computer program secure, the method including:

a step of stacking a predetermined value in an instruction stack of the program; and
  a step of unstacking said stack adapted, where appropriate, to detect an execution anomaly.

An instruction stack is an area of memory for temporarily storing data. Values are stacked in the stack and unstacked from it by means of two specific instructions, respectively called PUSH and POP in the remainder of the description.

These instructions manipulate only values of fixed size, for example one byte.

Use of the stack is controlled by a "last in first out" (LIFO) algorithm.

In particular, the stack stores the return address of a procedure (the RET instruction in the 80×86 assembler language, for example). This is known in the art. The method of the invention therefore uses the execution stack to store a value for detecting an execution anomaly.

An execution stack being fast to access in read and write modes and of low cost in terms of memory space, the method of the invention is particularly suitable for making secure computer programs executed on systems having limited resources.

This novel use of the instruction stack has other advantages that will be explained later.

BRIEF DESCRIPTION OF THE SEVERAL VIEWS OF THE DRAWING

FIG. 1 represents a preferred embodiment of a smart card 100 of the invention.

DETAILED DESCRIPTION OF THE INVENTION

In a preferred embodiment, the stacking and unstacking steps are respectively associated with elements of at least one subset of instructions of said program.

For example, the stacking step may be associated with the instruction "open(file)" to open a file and the unstacking step with the instruction "close(file)" to close that file.

This feature is particularly advantageous as it enables automation of the writing of instructions by associating the stacking and unstacking operations with the elements cited above, namely the instructions "open" and "close" in the above example, for example using an editor.

In a first variant of this preferred embodiment, the elements of the subset of instructions are respectively an opening bracket and a closing bracket of a system of brackets.

The person skilled in the art of computer languages knows that, in language theory, a system of brackets is present if a text includes as many opening brackets as closing brackets and any beginning of that text contains a number of opening brackets greater than or equal to the number of closing brackets.

According to this particularly advantageous feature, the stacking and unstacking steps may be respectively associated with the instructions:
 "(" and ")"; or
 "{" and "}"; or
 "begin" and "end"; or
 "repeat" and "until".

In another variant of this preferred embodiment, the unstacking step is associated with a return instruction of the program or a subroutine thereof.

This feature advantageously enables the use of normal unstacking operations effected conventionally on the return from a program or a subroutine (on execution of the return instruction) to detect an execution anomaly if the values unstacked on this occasion do not correspond to those that should have been unstacked in the event of normal execution of the program.

According to another feature of the invention, the program is in a programming language that includes a first instruction whose execution implements the stacking step and/or a second instruction whose execution implements said unstacking step.

In this embodiment, new instructions are integrated into the programming language, each instruction having its own function and either a stacking function or an unstacking function for the purposes of making the program secure.

Returning to the example briefly touched upon above, a new instruction called "open(file)" may be created, enabling simultaneous opening of the file and stacking of a predetermined value in the instruction stack of a program.

The programmer is therefore assured that security functions are executed on each file opening, without him even needing to think about this and without any particular software tool being necessary.

The second instruction preferably terminates the program or a subroutine of the program.

This embodiment has the same advantages as the embodiment referred to above in which the stacking and unstacking instructions are associated with elements of a subset of instructions of the program, rather than integrated into them. Consequently, it will not be described in detail hereinafter.

In a preferred embodiment of the invention, the predetermined value is representative of a subset of critical instructions of the program.

This feature is particularly advantageous when the method is used to make a plurality of subsets of instructions of the program secure.

It enables detection, during the unstacking step, that a particular subset of instructions has been executed correctly, rather than another subset of instructions whose execution would have led to the stacking of another predetermined value.

The person skilled in the art will readily understand that this feature may be used to make secure different branches of a test (of the type, "if", "then", "else" in the C language), a different predetermined value being stacked in each of the branches and the unstacking step being executed at the end of this test.

When the program calls a subroutine, this feature also assures, during the execution of that subroutine, that the subroutine was entered after the subroutine call and not after a fault attack.

Two examples of the use of this feature are described in detail hereinafter with reference to appendices A and C.

According to another feature of the invention, the method of the invention includes an anomaly processing step that is executed if a value other than the predetermined value is unstacked during the unstacking step.

This feature has the advantage of enabling execution of the anomaly processing step as soon as an attack has modified the normal execution of the program and in particular the call to or the return from execution of a function of that program. The method is then particularly effective.

In the case of using the method of the invention in a smart card, for example, anomaly processing may consist in rendering the card inoperative by destroying its operating system.

Three examples of the use of this feature are described in detail hereinafter with reference to appendices A, C and D.

In one particular embodiment in which the program includes at least one call to a subroutine, the unstacking step is executed before that call and the predetermined value eliminated from the stack during execution of the subroutine.

This feature therefore checks that the subroutine has been executed and that it has been executed correctly.

If the call to the subroutine has been skipped or if the unstacking step has not been executed, the instruction stack retains the stacked predetermined value.

Subsequent unstacking of that value leads to the detection of the execution anomaly, as explained below with reference to appendices B and C.

In this particular embodiment, the predetermined value may advantageously be the address of an anomaly processing function.

Thus if the predetermined value is not unstacked during execution of the subroutine, for example as a result of an attack the consequence of which is non-execution of the subroutine, subsequent unstacking of that value by the processor will lead to the execution of this processing function. An example is described in detail hereinafter with reference to appendix B.

This feature triggers the processing function if the program suffers any kind of attack whose consequence is to prevent execution of the subroutine. It is therefore particularly useful for making critical functions secure, for example an authentication procedure.

In another particular embodiment in which the program includes at least one call to a subroutine, the stacking step is executed during execution of the subroutine and the predetermined value is eliminated after execution of the subroutine.

This feature checks that the return from the subroutine is effected correctly.

If the return from the subroutine has been interfered with, the instruction stack retains the stacked predetermined value.

This particular embodiment is described in detail with reference to appendix D.

In this other particular embodiment, the predetermined value may advantageously be the address of an anomaly processing function.

For the reasons stated above, this feature triggers the processing function if the program suffers any kind of attack whose consequence is to prevent execution of the subroutine. It is therefore particularly useful for making critical functions secure, for example an authentication procedure.

An example of the use of this feature is given with reference to appendix E.

The invention also provides an information medium readable by a computer system, and where appropriate totally or partially removable, in particular a CD-ROM or a magnetic medium, such as a hard disk or a diskette, or a transmissible medium such as an electrical or optical signal, said information medium containing instructions of a computer program for executing a method as described briefly hereinabove if the program is loaded into and executed by an electronic data processing system.

The invention also provides a computer program stored on an information medium, the program including instructions for executing a method as described briefly hereinabove if that program is loaded into and executed by an electronic data processing system.

The invention is also aimed at a secure electronic entity and a smart card including means for implementing a method as briefly described above.

The particular advantages and features specific to the information medium, the computer program and the smart card being the same as those explained hereinabove with reference to the method of the invention, they will not be repeated here.

Other aspects and advantages of the present invention will become more clearly apparent on reading the following description of particular embodiments, that description being given entirely by way of nonlimiting example and with reference to appendices A to E, which contain five examples of computer programs made secure in accordance with the invention.

Those programs are written in the C language and in 80c51 assembler language. To facilitate the description thereof, each line is preceded by a commentary between the character strings "/*" and "*/".

A preferred embodiment of a smart card of the invention is described with reference to FIG. 1.

Appendix A comprises 33 lines of instructions numbered /*a1*/ to /*a33*/ of a computer program whose execution is made secure by a preferred embodiment of a method of the invention.

The line /*a1*/ is not an instruction as such. It symbolizes the fact that the program of appendix A may contain a certain number of instructions instead of the character string " . . . " in addition to the instructions for making the program secure. It represents a set of instructions unrelated to the present invention.

The line /*a2*/ includes a directive #pragma asm, indicating to the compiler that the subsequent instruction lines are in 80c51 assembler language.

The line /*a3*/ includes an instruction which performs a step of stacking the predetermined value 0 (in hexadecimal notation) in the instruction stack of the program of appendix A. For simplicity, it is stated hereinafter that the value 0 is stacked at the line /*a3*/.

Then the value 1 is stacked at the line /*a4*/.

In the preferred embodiment described here, the predetermined values 00h and 01h respectively represent the more significant byte and the less significant byte of the value 1 (in hexadecimal notation) coded on two bytes.

The line /*a5*/ includes a directive #pragma endasm, indicating to the compiler that the subsequent lines of instructions are no longer in 80c51 assembler language, but in C.

The lines /*a6*/ and /*a7*/ similar to the line /*a1*/ previously described represent a set of instructions unrelated to the present invention.

The line /*a8*/ includes an instruction during which a test is performed to determine if the content of the "test" variable is equal to "TRUE". If this is the case at the time of execution of the program of appendix A, the processor executes the instructions /*a9*/ to /*a23*/ after the test at line /*a8*/. This is known in the art.

Otherwise, it executes the instruction of the line /*a24*/ directly.

The line /*a9*/ is identical to the line /*a2*/described above.

The lines /*a10*/ and /*a11*/ are similar to the lines /*a3*/ and /*a4*/ described above. They stack in two stages the value 1 (in hexadecimal notation) coded on two bytes.

The line /*a12*/ is identical to the line /*a5*/described above.

The lines /*a13*/ and /*a14*/ similar to the line /*a1*/ described above represent a set of instructions unrelated to the present invention. Those instructions may of course manipulate the instruction stack provided that they leave the instruction stack, following line /*a14*/, in the state prior to the instruction /*a13*/.

The line /*a15*/ is identical to the line /*a2*/described above.

The line /*a16*/ includes an instruction whose execution performs a step of unstacking from the instruction stack, the unstacked value being stored in a register A. For simplicity, this is referred to hereinafter as unstacking into the register A in the line /*a16*/.

Following the instruction /*a16*/, the register A stores the last value stacked in the stack (the stack operates in accordance with an LIFO mechanism).

The line /*a17*/ includes an instruction for comparing the content of the register A with the value 02H. Normally, if the program has not been attacked during its execution since the end of the instruction in the line /*a11*/, the register A contains the value 02H stacked during the instruction in the line /*a11*/.

The unstacking step of the line /*a16*/ therefore enables detection of an execution anomaly by the method in accordance with the present invention.

If, during the comparison step of the line /*a17*/, it is found that the value of the register A is different from the value 02H, the program of appendix A branches to the "anomaly" address during the instruction of the line /*a18*/.

In the embodiment described here, that "anomaly" address is the address of an anomaly processing step of the method of the invention. In practice, the "anomaly" address is an address in hexadecimal notation that the processor can interpret directly.

On the other hand, if, during the comparison step of the line /*a17*/, it is found that the register A is storing the value 02H, the program of appendix A executes the instruction of the line /*a29*/.

The lines /*a19*/ to /*a21*/ are similar to the lines /*a16*/ to /*a18*/ described above:
  unstacking into the register A at the line /*a19*/;
  comparison of the register A with the value 00H at the line /*a20*/, the value 00H corresponding to the predetermined value stacked at the line /*a10*/; and
  branching to the "anomaly" address during the instruction of the line /*a21*/ if the register A does not contain the value 00H at the time of executing the instruction of the line /*a20*/.

On the other hand, if the register A contains the value 00H, the program executes the instruction of the line /*a22*/, which is identical to the line /*a5*/described above.

The lines /*a24*/ and /*a25*/ are similar to the line /*a1*/ described above and represent a set of instructions unrelated to the present invention.

The lines /*a26*/ to /*a33*/ are similar to the lines /*a15*/ to /*a22*/ described above.

They include unstacking steps /*a28*/ and /*a30*/enabling detection of a program execution anomaly if the stack has been corrupted and, just prior to execution of the instruction of the line /*a27*/, does not contain the predetermined values 01H and 00H stacked in the lines /*a4*/ and /*a3*/, respectively.

In conclusion, the two subsets of instructions respectively consisting of the lines /*a6*/ to /*a25*/and /*a13*/ to /*a14*/ are made secure.

The subset of instructions consisting of the lines /*a6*/ and /*a25*/ is made secure by:
  the step of stacking the predetermined value 1 coded on two bytes (lines /*a3*/ and /*a4*/); and
  the stacking step of the lines /*a27*/ and /*a30*/.

Similarly, the subset of instructions consisting of the lines /*a13*/ and /*a14*/ is made secure by:
  the step of stacking the predetermined value 2 coded on two bytes (lines /*a10*/ and /*a11*/); and
  the stacking step of the lines /*a16*/ and /*a19*/.

This implementation is in no way limiting on the invention, and the predetermined values 1 and 2 could also be identical or selected at random.

Appendix B includes 28 lines of instructions numbered /*b1*/ to /*b28*/ of a computer program whose execution is made secure by a preferred embodiment of the method of the invention.

The lines /*b1*/ and /*b2*/ constitute the first two lines declaring the function "function" in C, that function having no input parameter and no return value.

The line /*b11*/ includes the last instruction of the declaration of that function.

The line /*b3*/ similar to the line /*a1*/described above with reference to appendix A represents a set of instructions unrelated to the present invention.

The line /*b4*/ is identical to the line /*a2*/described above with reference to appendix A.

During the instructions of lines /*b5*/ and /*b6*/, there is effected, in two stages, a step of stacking a predetermined value coded on two bytes, that value being, in the preferred embodiment of the invention, the address of an anomaly processing function OS_killcard. In practice, the address "OS_killcard" is an address in hexadecimal notation that the processor can interpret directly.

In the case of using the method to make a microcircuit card secure, the function OS_killcard may, for example, inhibit the functioning of the card by destroying its operating system.

The line /*b7*/ is identical to the line /*a5*/described above with reference to appendix A.

The line /*b8*/ similar to the line /*a1*/described above with reference to appendix A represents a set of instructions unrelated to the present invention.

The line /*b9*/ includes an instruction for calling a critical function "critical_function", the code of which is described with reference to lines /*b12*/ to /*b28*/.

Calling a subroutine automatically leads to stacking of the return of address of that subroutine in the stacked instructions. This is known in the art. The return address, coded on two bytes, therefore occupies two registers of the stack. In the present example, this address corresponds to the address of the instruction of the line /*b10*/, which must be executed on the return from the function "critical_function".

The lines /*b12*/ and /*b13*/, on the one hand, and /*b28*/, on the other hand, constitute the first two lines and the last line of the declaration of the function "critical_function", that function having no input parameter and no return value.

After execution of the instructions of the lines /*b12*/ and /*b13*/, the last four values stacked in the instruction stack are, in chronological order:
  the more significant byte of the address of the function OS_killcard (line /*b5*/);
  the less significant byte of the address of the function OS_killcard (line /*b6*/);
  the more significant byte of the address of the first instruction of the line /*b10*/; and
  the less significant byte of the address of the first instruction of the line /*b10*/.

The line /*b14*/ similar to line /*a1*/ described above with reference to appendix A represents a set of instructions unrelated to the present invention.

As described above with reference to the lines /*a13*/ and /*a14*/ of appendix A, it is assumed that these instructions leave the instruction stack in the state in which it was prior to the instruction /*b14*/.

The line /*b15*/ is identical to the line /*a2*/described above with reference to appendix A.

In the line /*b16*/, the instruction stack is unstacked into the register A, the content of that register A being thereafter saved in a register R7 in the step /*b17*/.

Similarly, in the line /*b18*/, the instruction stack is again unstacked into the register A, the content of that register A being saved in a register R6 in the step /*b19*/.

In the light of the foregoing, and in the event of normal execution of the program of appendix B, the registers R6 and R7 therefore contain, respectively, after the execution of the instruction from the line /*b19*/:

the more significant byte of the address of the first instruction of the line /*b10*/; and the less significant byte of the address of the first instruction of the line /*b10*/.

The instruction stack is then unstacked twice into the register A, in the lines /*b20*/ and /*b21*/, which in the case of normal execution of the program of appendix B amounts to removing the address on two bytes of the function OS_killcard from the instruction stack during the execution of the subroutine "critical_function".

In the line /*b22*/, there is stored in the register A the content of the register R6, namely the more significant byte of the first instruction of the line /*b10*/, that value being stacked in the instruction stack in the step of the line /*b23*/.

In exactly the same way, the less significant byte of the first instruction of the line /*b10*/ is stacked, this byte being stored in the register R7, at the lines /*b24*/ and /*b25*/.

The line /*b26*/ is identical to the line /*a5*/described above with reference to appendix A.

The line /*b27*/ similar to the line /*a1*/described above with reference to appendix A represents a set of instructions unrelated to the present invention.

The line /*b28*/ is the last line of the subroutine "critical_function". It is translated into assembler language by a "RETURN" or "RET" type instruction whose execution causes the program to jump to the address stored in the first two registers of the instruction stack. This is known in the art.

If it is not attacked while it is being executed, the program branches to the first instruction of the line /*b10*/, the address of that instruction having been stacked at the lines /*b23*/ and /*b25*/.

The line /*b10*/ similar to the line /*a1*/described above with reference to appendix A represents a set of instructions unrelated to the present invention.

The line /*b11*/ terminates the function "function".

In conclusion, in the particular embodiment of appendix B, the step of stacking the address of the function OS_killcard is effected before calling the subroutine "critical_function", that address being removed from the stack during the execution of that subroutine, at the lines /*b20*/ and /*b21*/.

This embodiment therefore checks that the subroutine "critical_function" has actually been executed.

For example, if the call to that subroutine has been interfered with, or more generally if the unstacking step had not been effected, the instruction stack retains the value of the function OS_killcard, subsequent unstacking of that value, for example at the time of executing a return instruction, leading to detection of that execution anomaly and execution of the anomaly processing function OS_killcard.

Appendix C contains 32 lines of instructions numbered /*c1*/ to /*c32*/ of a computer program whose execution is made secure by a preferred embodiment of a method of the invention.

The lines /*c1*/ to /*c11*/ are similar to the lines /*b1*/ to /*b11*/ described with reference to appendix B, except that the predetermined value 05F1H coded in hexadecimal on two bytes is stacked in the instruction stack, instead of the address of the function OS_killcard (lines /*c5*/ and /*c6*/).

This stacking step is again effected before the call to the subroutine critical_function.

In this particular embodiment, the predetermined value 05F1H is representative of the subset consisting of the instructions of the lines /*c12*/ to /*c19*/.

The lines /*c12*/ to /*c19*/ are similar to the lines /*b12*/ to /*b19*/ described with reference to appendix B.

In the event of normal execution of the program of appendix C, the registers R6 and R7 therefore contain, respectively, after the execution of the instruction of the line /*c19*/, the more significant byte and the less significant byte of the address of the first instruction of the line /*c10*/ corresponding to the return address of the function "critical_function".

The instruction stack is then unstacked into the register A at the line /*c20*/, the content of that register being thereafter compared with the hexadecimal value F1H at the line /*c21*/.

Normally, if the program has not been attacked, in particular at the time of calling the function "critical_function", the register A contains the value F1H stacked during the instruction of the line /*c5*/.

The unstacking step of the line /*c20*/ therefore thus allows the detection of an execution anomaly in accordance with the present invention.

If, during the comparison step of the line /*c21*/, it is found that the value of the register A is different from the value F1H, the program of appendix C branches to the address "OS_killcard" during the instruction of the line /*c22*/. This may occur in particular after a fault attack that would lead to execution of the function "critical_function" without being called.

In this embodiment of the method of the invention, the anomaly processing program OS_killcard is therefore executed if, during the step of unstacking the instruction /*c20*/, a value is unstacked that is different from the predetermined value F1H stacked at the instruction /*c6*/.

On the other hand, if during the comparison step of the line /*c21*/ it is found that the register A is holding the value F1H, the program of appendix C executes the instruction from the line /*c23*/.

The lines /*c23*/ to /*c25*/ are similar to the lines /*c20*/ to /*c22*/ described above:

unstacking in the register A at line /*c23*/;

comparison of the register A with the value 05H at the line /*c24*/, the value 05H being the predetermined value stacked at the line /*c5*/; and branching to the address "OS_killcard" during the instruction of the line /*c25*/ if the register A does not contain the value 05H at the moment of execution of the instruction of the line /*c25*/.

On the other hand, if the register A contains the value 05H, the program executes the instruction of the line /*c26*/.

Be this as it may, executing the instructions of lines /*c20*/ and /*c23*/ eliminates the predetermined value 05F1H from the execution stack.

The lines /*c26*/ to /*c29*/ are similar to the lines /*b22*/ to /*b25*/ described above with reference to appendix B.

They are used to stack in the instruction stack the values stored in the registers R6 and R7 during the execution of the instructions of the lines /*c17*/ and /*c19*/, namely, respectively:

the more significant byte of the address of the first instruction of the line /*c10*/; and the less significant byte of the address of the first instruction of the line /*c10*/.

The lines /*c30*/ to /*c32*/ are similar to the lines /*b26*/ to /*b28*/ described above with reference to appendix B.

If there has not been any attack, the program therefore branches to the first instruction of the line /*c10*/, the address of that instruction having been stacked at the lines /*c27*/ and /*c29*/.

The line /*c10*/ similar to line /*a1*/ described above with reference to appendix A represents a set of instructions unrelated to the present invention and the line /*c11*/ terminates the function "function1" of appendix C.

In this embodiment, the value 05F1H could have been the address of an anomaly processing function. This particular embodiment makes the program even more secure because even if an attack occurs during the execution of the test of the lines /*c20*/ to /*c25*/, that attack would be detected by the subsequent use of that anomaly processing function.

Instead, a plurality of addresses of anomaly processing functions may be used, each being a predetermined value associated with a set of critical instructions.

Appendix D comprises 32 lines of instructions numbered /*d1*/ to /*d32*/ of a computer program whose execution is made secure by a preferred embodiment of a method of the invention.

In this particular embodiment, the program includes, at the line /*d4*/, a call to a subroutine "critical_function".

That call automatically leads to stacking of the return address of that subroutine, namely the address of the instruction of the line /*d5*/.

During execution of the instructions of the lines /*d20*/ to /*d23*/ of the subroutine "critical_function", there are stored in the registers R6 and R7 the first values of the stack of instructions, namely the return address, coded on two bytes, of that subroutine.

The predetermined value 05F1H is then stacked at the lines /*d24*/ and /*d25*/.

It will be noted that, in this embodiment, this stacking step is effected during execution of the subroutine "critical_function".

Finally, during execution of the instructions of the lines /*d27*/ and /*d29*/, the contents of the registers R6 and R7 are stacked, these registers containing the address of the instruction of the line /*d5*/, as explained above.

The program of the appendix D therefore branches to the line /*d5*/ at the end of the subroutine "critical_function".

Before executing the instruction of the line /*d5*/, the first two values of the instruction stack are normally the predetermined values 05H and F1H stacked at the lines /*d24*/ and /*d25*/.

The line /*d5*/ similar to line /*a1*/ described above with reference to appendix A represents a set of instructions unrelated to the present invention. It is assumed that those instructions leave the instruction stack in the state prior to the line /*d5*/.

The lines /*d7*/ to /*d12*/ are similar to the lines /*c20*/ to /*c25*/ described above with reference to appendix C:
  unstacking in the register A at the lines /*d7*/ and /*d12*/;
  comparison of the register A with the predetermined values F1H and 05H at the lines /*d8*/ and /*d11*/;
  branching to the address "OS_killcard" during the instruction /*d9*/ (respectively /*d12*/) if the register A does not contain the value F1H (respectively 05H) at the moment of executing the instruction of the line /*d9*/ (respectively /*d12*/).

The anomaly processing subroutine OS_killcard is therefore executed if, for example, during the unstacking step /*d7*/, a value different from the predetermined value F1H is unstacked.

It will be noted that in this embodiment, the predetermined value 05F1H is eliminated from the execution stack after execution of the subroutine "critical_function" and not after an attack taking place at the time of executing another subroutine, the consequence of that attack being execution of the lines /*d6*/ to /*d13*/.

This implementation therefore assures that the instructions of the lines /*d6*/ to /*d13*/ are effected after execution of the subroutine "critical_function".

The lines /*d14*/ and /*d15*/ terminate the program of appendix D.

Appendix E contains 28 lines of instructions numbered /*e1*/ to /*e28*/ of a computer program whose execution is made secure by a preferred embodiment of a method of the invention.

The lines /*e1*/ to /*e5*/ and /*e12*/ to /*e28*/ are respectively similar to the lines /*d1*/ to /*d5*/ and /*d16*/ to /*d32*/ described with reference to appendix D, except that the address of the anomaly processing function OS_killcard (lines /*e20*/ and /*e21*/) is stacked in the instruction stack instead of the predetermined value 05F1H.

That stacking step is also effected during the execution of the subroutine "critical_function".

The program of appendix E therefore branches to the line /*e5*/ after the subroutine "critical_function".

Before execution of the instruction of the line /*e5*/, the first two values of the instruction stack are normally the addresses of the less significant byte and the more significant byte of the function OS_killcard, those predetermined values having been stacked at the lines /*e21*/ and /*e20*/.

Those values are unstacked during execution of the instructions of the lines /*e7*/ and /*e8*/.

This particular embodiment ensures that the function "critical_function" is executed after it has been called and not following a fault attack.

Otherwise, unstacking the address of the function OS_killcard at the inevitable time of returning from the execution of a subroutine would enable detection of an execution anomaly, in particular by implementing this function.

The lines /*e10*/ and /*e11*/ terminate the program of appendix E.

FIG. 1 represents a preferred embodiment of a smart card 100 of the invention.

For simplicity, only the content of the microcircuit is shown, and is shown diagrammatically.

The smart card 100 of the invention further includes conventional smart card hardware and software elements, in particular a semi-rigid material support and power supply means. All of this is known in the art and these elements are not described here.

The microcircuit card 100 of the invention includes means for executing a method as described above with reference to appendices A to E.

In the preferred embodiment described here, those means consist of a processor 110 associated in particular with non-volatile EEPROM, RAM containing an instruction stack (STACK), and ROM containing an operating system (OS).

The semi-volatile EEPROM contains in particular the programs of appendices A to E, the processor 100 reading those programs in order to execute them.

The EEPROM also contains the two subroutines "anomaly" and "OS_killcard".

During execution of the programs of appendices A to E, the registers R6, R7 and the test register are stored in RAM.

In the embodiment described here, the register A is the accumulator of the processor 110.

APPENDIX A

| | |
|---|---|
| /*a1*/ | ... |
| /*a2*/ | #pragma asm |
| /*a3*/ | push #00h |
| /*a4*/ | push #01h |

APPENDIX A-continued

```
/*a5*/     #pragma endasm
/*a6*/     ...
/*a7*/     ...
/*a8*/     if (test = TRUE) {
/*a9*/         #pragma asm
/*a10*/        push #00h
/*a11*/        push #02h
/*a12*/        #pragma endasm
/*a13*/        ...
/*a14*/        ...
/*a15*/        #pragma asm
/*a16*/        pop A
/*a17*/        XRL A, #02h
/*a18*/        JNZ anomaly
/*a19*/        pop A
/*a20*/        XRL A, #00h
/*a21*/        JNZ anomaly
/*a22*/        #pragma endasm
/*a23*/    }
/*a24*/    ...
/*a25*/    ...
/*a26*/    #pragma asm
/*a27*/    pop A
/*a28*/    XRL A, #01h
/*a29*/    JNZ anomaly
/*a30*/    pop A
/*a31*/    XRL A, #00h
/*a32*/    JNZ anomaly
/*a33*/    #pragma endasm
```

APPENDIX B

```
/*b1*/     void function(void)
/*b2*/     {
/*b3*/         ...
/*b4*/         #pragma asm
/*b5*/         push #HIGH(OS_killcard)
/*b6*/         push #LOW(OS_killcard)
/*b7*/         #pragma endasm
/*b8*/         ...
/*b9*/         critical_function( );
/*b10*/        ...
/*b11*/    }
/*b12*/    void critical_function(void)
/*b13*/    {
/*b14*/        ...
/*b15*/        #pragma asm
/*b16*/        pop A
/*b17*/        mov R7, A
/*b18*/        pop A
/*b19*/        mov R6, A
/*b20*/        pop A
/*b21*/        pop A
/*b22*/        mov A, R6
/*b23*/        push A
/*b24*/        mov A, R7
/*b25*/        push A
/*b26*/        #pragma endasm
/*b27*/        ...
/*b28*/    }
```

APPENDIX C

```
/*c1*/     void function1(void)
/*c2*/     {
/*c3*/         ...
/*c4*/         #pragma asm
/*c5*/         push #05h
/*c6*/         push #F1h
/*c7*/         #pragma endasm
/*c8*/         ...
/*c9*/         critical_function( );
/*c10*/        ...
/*c11*/    }
/*c12*/    void critical_function(void)
```

APPENDIX C-continued

```
/*c13*/    {
/*c14*/        ...
/*c15*/        #pragma asm
/*c16*/        pop A
/*c17*/        mov R7, A
/*c18*/        pop A
/*c19*/        mov R6, A
/*c20*/        pop A
/*c21*/        XRL A, #F1h
/*c22*/        JNZ OS_killcard
/*c23*/        pop A
/*c24*/        XRL A, #05h
/*c25*/        JNZ OS_killcard
/*c26*/        mov A, R6
/*c27*/        push A
/*c28*/        mov A, R7
/*c29*/        push A
/*c30*/        #pragma endasm
/*c31*/        ...
/*c32*/    }
```

APPENDIX D

```
/*d1*/     void function(void)
/*d2*/     {
/*d3*/         ...
/*d4*/         critical_function( );
/*d5*/         ...
/*d6*/         #pragma asm
/*d7*/         pop A
/*d8*/         XRL A, #F1h
/*d9*/         JNZ OS_killcard
/*d10*/        pop A
/*d11*/        XRL A, #05h
/*d12*/        JNZ OS_killcard
/*d13*/        #pragma endasm
/*d14*/        ...
/*d15*/    }
/*d16*/    void critical_function(void)
/*d17*/    {
/*d18*/        ...
/*d19*/        #pragma asm
/*d20*/        pop A
/*d21*/        mov R7, A
/*d22*/        pop A
/*d23*/        mov R6, A
/*d24*/        push #05h
/*d25*/        push #F1h
/*d26*/        mov A, R6
/*d27*/        push A
/*d28*/        mov A, R7
/*d29*/        push A
/*d30*/        #pragma endasm
/*d31*/        ...
/*d32*/    }
```

APPENDIX E

```
/*e1*/     void function(void)
/*e2*/     {
/*e3*/         ...
/*e4*/         critical_function( )
/*e5*/         ...
/*e6*/         #pragma asm
/*e7*/         pop A
/*e8*/         pop A
/*e9*/         #pragma endasm
/*e10*/        ...
/*e11*/    }
/*e12*/    void critical_function(void)
/*e13*/    {
/*e14*/        ...
/*e15*/        #pragma asm
/*e16*/        pop A
/*e17*/        mov R7, A
```

APPENDIX E-continued

```
/*e18*/   pop A
/*e19*/   mov R6, A
/*e20*/   push #HIGH(OS_killcard)
/*e21*/   push #LOW(OS_killcard)
/*e22*/   mov A, R6
/*e23*/   push A
/*e24*/   mov A, R7
/*e25*/   push A
/*e26*/   #pragma endasm
/*e27*/   ...
/*e28*/   }
```

The invention claimed is:

1. A method of making the execution of a computer program secure, the method comprising:
a processor performing:
a step of stacking a predetermined value in an instruction stack of the program; said predetermined value being an address of an anomaly processing function,
during the normal execution of the program, a step of removing said predetermined value from the instruction stack, without executing the anomaly processing function; and
a step of unstacking said stack wherein if said predetermined value is unstacked, the anomaly processing function is executed.

2. The method according to claim 1, wherein said stacking and unstacking steps are respectively associated with elements of at least one subset of instructions of said program.

3. The method according to claim 2, wherein said elements are respectively an opening bracket and a closing bracket in a system of brackets.

4. The method according to claim 2, wherein said unstacking step is associated with a return instruction of said program or a subroutine of said program.

5. The method according to claim 1, wherein said program is written in a programming language including at least one of a first instruction whose execution implements said stacking step and a second instruction whose execution implements said unstacking step.

6. The method according to claim 5, wherein the second instruction terminates said program or a subroutine of said program.

7. The method according to claim 1, wherein said program includes at least one call to a subroutine, wherein said stacking step is effected before said call and said predetermined value is eliminated from said stack during execution of said subroutine.

8. The method according to claim 1, wherein said programming includes at least one call to a subroutine, wherein said stacking step is effected during execution of said subroutine and said predetermined value is eliminated from said stack after execution of said subroutine.

9. The method according to claim 1, wherein the anomaly processing function destroys an operating system of a smart card.

* * * * *

UNITED STATES PATENT AND TRADEMARK OFFICE
CERTIFICATE OF CORRECTION

PATENT NO.      : 8,707,424 B2  Page 1 of 1
APPLICATION NO. : 10/563554
DATED           : April 22, 2014
INVENTOR(S)     : Fischer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2543 days.

Signed and Sealed this
Twenty-ninth Day of September, 2015

Michelle K. Lee
*Director of the United States Patent and Trademark Office*